United States Patent [19]

Wright, IV et al.

[11] Patent Number: 5,676,473
[45] Date of Patent: Oct. 14, 1997

[54] METHOD AND APPARATUS FOR U.P.C./EAN SYMBOLOGY AMBIGUOUS CHARACTER COMPENSATION BY LOCALIZED THERMAL ENERGY DOT ADJUSTMENT

[75] Inventors: George Wright, IV, New Canaan, Conn.; H. Sprague Ackley, Seattle, Wash.

[73] Assignee: Intermec Corporation, Everett, Wash.

[21] Appl. No.: 640,577

[22] Filed: Apr. 24, 1996

[51] Int. Cl.⁶ ................................................ B41J 05/00
[52] U.S. Cl. ........................................ 400/103; 395/151
[58] Field of Search ............................ 400/61, 76, 103, 400/104; 347/107; 395/108, 109, 110, 150, 151

[56] References Cited

U.S. PATENT DOCUMENTS

| | | | |
|---|---|---|---|
| 3,975,707 | 8/1976 | Ito et al. | 346/76 R |
| 4,567,488 | 1/1986 | Moriguchi et al. | 346/76 PH |
| 4,661,001 | 4/1987 | Takai et al. | 400/103 |
| 4,795,281 | 1/1989 | Ulinski, Sr. et al. | 400/74 |
| 4,824,266 | 4/1989 | Fujii et al. | 400/103 |
| 4,864,112 | 9/1989 | Imai et al. | 400/103 |
| 4,870,428 | 9/1989 | Kuwabara et al. | 346/76 PH |
| 4,937,590 | 6/1990 | Robillard et al. | 346/76 PH |
| 5,183,343 | 2/1993 | Tazawa et al. | 400/103 |
| 5,564,841 | 10/1996 | Austin et al. | 400/103 |

FOREIGN PATENT DOCUMENTS

| | | |
|---|---|---|
| 0 329 369 A2 | 8/1989 | European Pat. Off. . |
| 2 228 450 | 8/1990 | United Kingdom . |

*Primary Examiner*—Edgar S. Burr
*Assistant Examiner*—Steven S. Kelley
*Attorney, Agent, or Firm*—Seed and Berry LLP

[57] ABSTRACT

A method and apparatus is disclosed that can be used to print the U.P.C./EAN symbology in a way that does not suffer poor print quality over a range of ink spread conditions by applying appropriately more or less thermal energy to at least one row of dots on the internal edges of the ambiguous characters. The resultant characters have identical edge-to-edge measurements to those without the compensation; but, the sum of the widths of the bars are beneficially adjusted. The resulting print quality grades and scanning performance are enhanced on thermal printer platforms of moderate to high resolution.

17 Claims, 6 Drawing Sheets

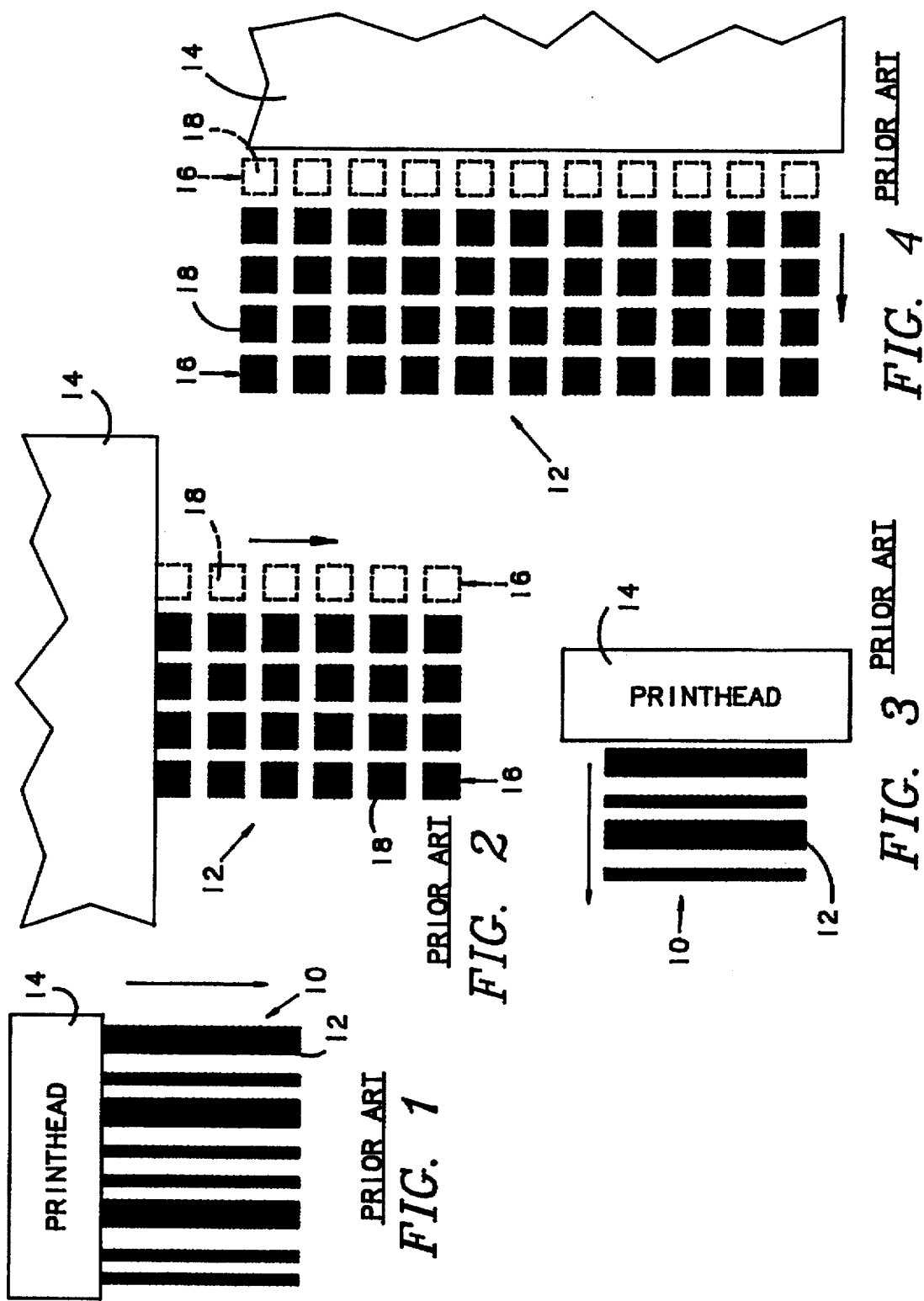

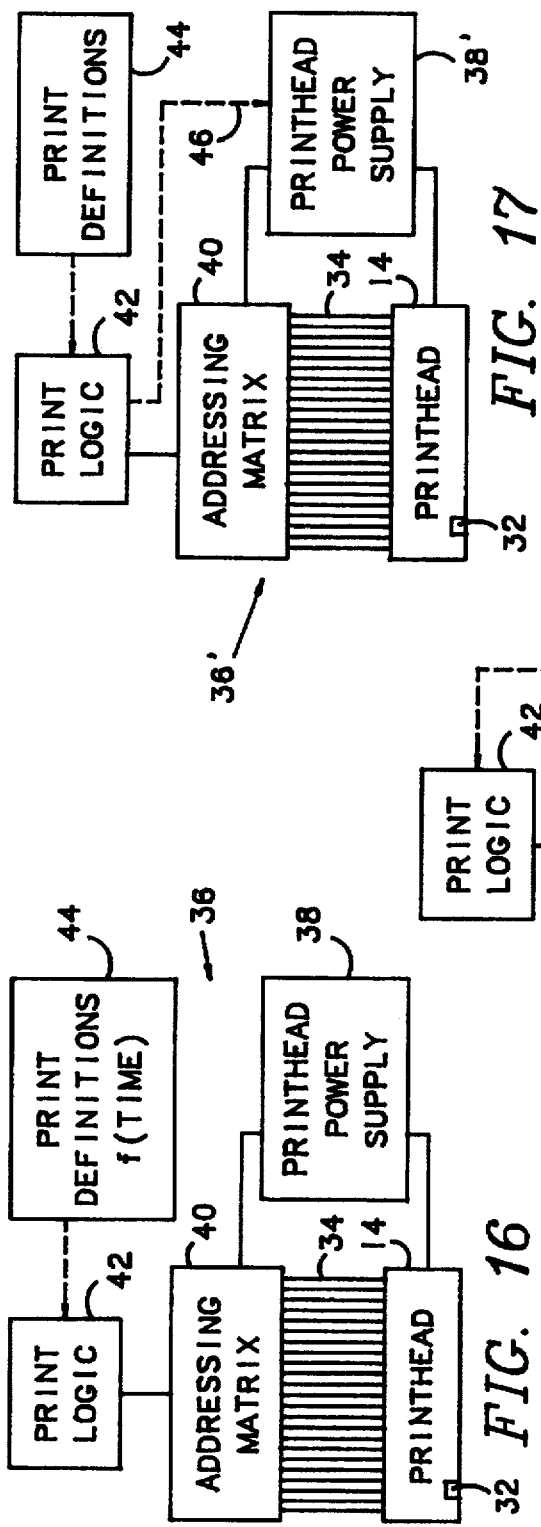
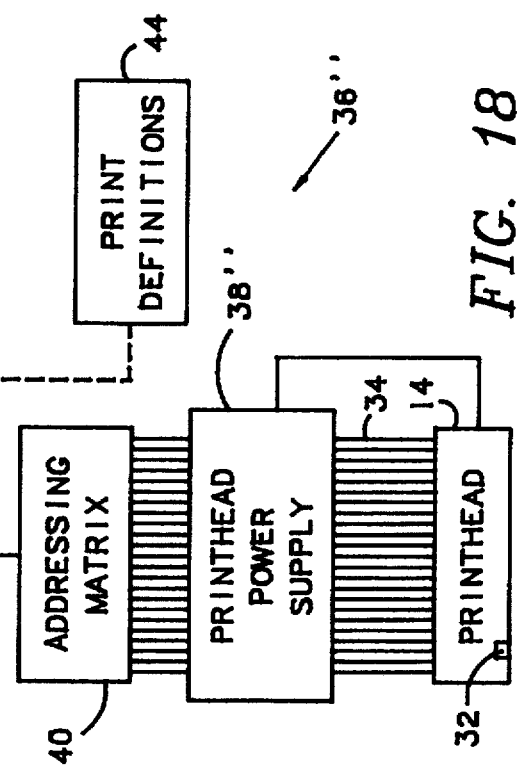
FIG. 17
FIG. 18
FIG. 16

METHOD AND APPARATUS FOR U.P.C./EAN SYMBOLOGY AMBIGUOUS CHARACTER COMPENSATION BY LOCALIZED THERMAL ENERGY DOT ADJUSTMENT

BACKGROUND OF THE INVENTION

1. Technical Field

This invention relates to the general area of bar code symbology printing and particularly to the printing of the U.P.C./EAN symbology by thermal means. More specifically, in a demand printer printing a pre-defined U.P.C./EAN symbology character set having "left odd", "left even", "right even", and "right odd" versions as a series of bars separated by spaces in which the bars are formed of horizontal rows of closely adjacent dots by logic designating dots to be printed in the horizontal rows of the bars of the characters, it relates to an improvement to prevent ambiguous decoding of "1", "2", "7", and "8" characters printed by the printer comprising the logic including adjusting logic which adjusts the pre-defined U.P.C./EAN symbology character set for the "1", "2", "7", and "8" characters by, reducing the size of one edge dot per horizontal row from bars of left odd and right odd "1" and "2" characters and of left even and right even "7" and "8" characters; and, increasing the size of one edge dot per horizontal row to bars of left even and right even "1" and "2" characters and to left odd and right odd "7" and "8" characters.

2. Background Art

Bar code symbols have been printed and scanned for many years, particularly in the general retail segment. The symbology used at the point-of-sale and elsewhere is called U.P.C./EAN and is comprised of several characters in a particular arrangement with other elements. A well known weakness of the symbology is that four of the ten numerical characters in the set have an ambiguous decode when following the UCC-published reference decode algorithm according to the "Quality Specification for the U.P.C. Printed Symbol". In other words, the digits "1" versus "7" and "2" versus "8" require additional information to decode uniquely because the commonly used method called "edge-to-edge" fails to distinguish between them. Consequently, the sum of the widths of the bars needs to be assessed before a decode can be unique. To aid in this determination, the symbology specification requires a 1/13th addition or subtraction to the requisite elements to help compensate for the symbology deficiency; and, the measurement of print quality includes this factor.

When most all symbols were printed using film masters and formed-font impact printers, this correction was easily accomplished because each method involved a step of creating a film which had in excess of 10,000 dots-per-inch resolution. Since symbols began being printed using dot matrix type printers, it has been assumed generally that the correction was not possible. Consequently, it is well known that matrix-produced symbols, such as thermal direct and thermal transfer, would suffer in their print quality—especially if the symbols were printed with uniform bar growth or shrinkage, sometimes called "ink spread".

In a co-pending patent application entitled U.P.C./EAN SYMBOLOGY FONT OPTIMIZATION IN AN ON-DEMAND PRINTER by co-inventor H. Sprague Ackley herein, filed on 23 Aug. 1995 as Ser. No. 08/518,423, assigned to the common assignee of this invention, the teachings of which are incorporated herein by reference, a procedure is taught and claimed whereby the compensation could be made with thermal and other matrix printers by selectively adding or subtracting one or more dots from specific edges of U.P.C./EAN characters. The disclosed teaching of that application allows symbols to be printed throughout a reasonable range of ink-spread conditions and maintain excellent print quality (i.e. A or 4 according to the published specification) without ever suffering any detrimental reading or print quality measurement effect. The disclosure also teaches that the print quality measurement parameter, called "decodability", is insensitive to compensation that is greater than 1/13 of a module, thereby allowing all reasonable print resolutions {such as 300, 400, and 600 dots-per-inch (dpi)} to produce excellent symbols. Consequently, any matrix printer with sufficient resolution can be used by modifying the U.P.C./EAN font for the ambiguous characters appropriately. This technique is depicted in FIGS. 1 through 4.

FIGS. 1 and 2 relate to the printing of a bar code 10 in a so-called "drag" mode wherein the bars 12 of the bar code 10 are printed by the printhead 14 perpendicular to the printhead 14. As best seen in FIG. 2, each bar 12 is comprised of a number of columns 16 of dots 18. The dots 18 of each column 16 are printed by the same print element or print position (not shown) within or of the printhead 14. To eliminate a column 16 of dots 18 of a bar 12, the column 16 is not printed by the associated print element or print position of the printhead 14 as indicated by the ghosted column 16 of FIG. 2.

FIGS. 3 and 4 relate to the printing of a bar code 10 in a so-called "picket fence" mode wherein the bars 12 of the bar code 10 are printed by the printhead 14 parallel to the printhead 14. As best seen in FIG. 4, to eliminate a column 16 of dots 18 of a bar 12, the column 16 is not printed by the entire printhead 14 as indicated by the ghosted column 16 of FIG. 2.

Alternately, the disclosure also teaches that lower resolution printers can be used if their media stepping motors are programmed to advance in partial module increments. This approach is depicted in FIGS. 5 through 9. As will be appreciated from the following description, this approach only works in the picket fence mode of printing bar codes. The bar code printer 20 employs a stepping motor 22 to drive a roller 24 which, in turn, moves the media 26 under the printhead 14. The print logic 28 controls both the stepping motor 22 and the printhead 14. As depicted in FIG. 7, the stepping motor 22 normally moves two steps between the printing of adjacent dots 18. This produces the normal dot spacing depicted in FIG. 8. By employing the logic of FIG. 6, a column 16 can be shaved in width by only moving the stepping motor one step between adjacent dots 18 thereby causing an overlapping of the adjacent dots 18 as depicted in FIG. 9.

The disadvantage of the above-described methods of the co-pending application is that many matrix printers in use today do not have sufficient resolution to produce reasonable U.P.C./EAN fonts such as the family of printers at or near 200 dpi. If a row of dots were removed from a 192 dpi printer, for instance, the resulting narrow spaces or bars would likely be too small to resolve with a standard point-of-sale scanning device. Alternately, if partial module stepping were employed, only symbols in one orientation could be successfully modified with this approach and it would require substantial mechanical overhead.

Where a thermal printhead is employed, the size or diameter of the dots produced at each printing position can be adjusted within a limited amount by the power applied to the printhead. Thus, there is a potential for implementing the general concept of the above-referenced co-pending application by adjusting dot size rather than eliminating columns of dots totally or changing their print position.

Wherefore, it is the object of the present invention to provide methods and apparatus for selectively adding to or subtracting from the width of one or more dots from specific edges of U.P.C./EAN characters.

Other objects and benefits of this invention will become apparent from the description which follows hereinafter when read in conjunction with the drawing figures which accompany it.

SUMMARY

The foregoing object has been achieved in a demand printer printing a pre-defined U.P.C./EAN symbology character set having "left odd", "left even", "right even", and "right odd" versions as a series of bars separated by spaces in which the bars are formed of horizontal rows of closely adjacent dots by logic designating dots to be printed in the horizontal rows of the bars of the characters, by the method and associated apparatus of the present invention for preventing ambiguous decoding of "1", "2", "7", and "8" characters printed by the printer wherein the method comprises the step of adjusting the pre-defined U.P.C./EAN symbology character set for the "1", "2", "7", and "8" characters by:

reducing the size of one edge dot per horizontal row from bars of left odd and right odd "1" and "2" characters and of left even and right even "7" and "8" characters; and, increasing the size of one edge dot per horizontal row to bars of left even and right even "1" and "2" characters and to left odd and right odd "7" and "8" characters.

Where the printer has a thermal printhead comprising a plurality of dot-producing heating elements, the step may further comprise, reducing the power level being input to the heating element producing the one edge dot per horizontal row from bars of left odd and right odd "1" and "2" characters and of left even and right even "7" and "8" characters; and, increasing the power level being input to the heating element producing the one edge dot per horizontal row to bars of left even and right even "1" and "2" characters and to left odd and right odd "7" and "8" characters.

It may also comprise, reducing the time a constant power level is input to the heating element producing the one edge dot per horizontal row from bars of left odd and right odd "1" and "2" characters and of left even and right even "7" and "8" characters; and, increasing the time a constant power level is input to the heating element producing the one edge dot per horizontal row to bars of left even and right even "1" and "2" characters and to left odd and right odd "7" and "8" characters.

Preferably, the one edge is a same interior edge of the associated character and there are corresponding adjustments to spaces of characters associated with adjusted width bars so as to cause edge-to-edge measurements of "1", "2", "7", and "8" U.P.C./EAN symbology characters printed thereby not to be effected by the adjustment.

DESCRIPTION OF THE DRAWINGS

FIG. 1 is a simplified drawing showing a printhead printing a bar code in the drag mode.

FIG. 2 is a more detailed drawing of one bar of the bar code of FIG. 1.

FIG. 3 is a simplified drawing showing a printhead printing a bar code in the picket fence mode.

FIG. 4 is a more detailed drawing of one bar of the bar code of FIG. 3.

FIG. 16 is a simplified functional block diagram of a printer according to the present invention for printing in the picket fence mode where dot size is adjusted across the printhead by adjusting the time of applied power.

FIG. 17 is a simplified functional block diagram of a printer according to the present invention for printing in the picket fence mode where dot size is adjusted across the printhead by adjusting the level of applied power.

FIG. 18 is a simplified functional block diagram of a printer according to the present invention for printing in the drag mode where dot size is adjusted on a dot-by-dot basis across the printhead by adjusting the level of applied power to each individual print position.

DESCRIPTION OF THE PREFERRED EMBODIMENT

As will be seen from the detailed description that follows, this invention gets around the above-described shortcomings of the above-referenced co-pending application under certain circumstances by drawing upon prior art teachings of a general nature which describe how thermal management within a thermal printhead can be controlled on a dot-by-dot basis. It should be noted, however, that these prior art teachings are generic for any type of printing whether bar codes, human readable text, or other graphics. The present invention is based on the specific proposition that if the thermal energy assigned to individual dots of certain edges of the ambiguous characters of U.P.C./EAN symbology were managed properly, the requisite printing adjustment could be applied to any resolution providing there are at least two dots printed per element. The present invention could be beneficially applied to printers having only one dot per element also; but, would necessarily effect the uniformity of the character widths and, consequently, this is not a preferred embodiment. As will be seen, the thermal adjustment can be applied in either orientation, or both, of bar code printing; and, would be equally beneficial to the measurement of print quality and the scanning of these enhanced symbols.

Figure 6:
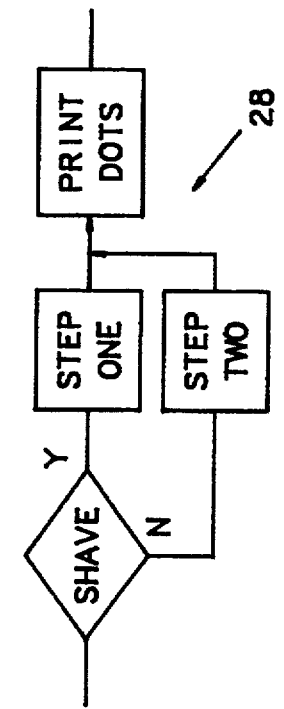
FIG. 6 is a flowchart of prior art logic for printing shaved bars with the printer of FIG. 5.
Figure 9:
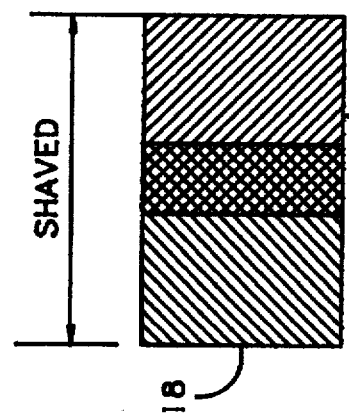
FIG. 9 is an enlarged simplified drawing showing the prior art shaved print spacing of adjacent dots by the printer of FIG. 5.
Figure 5:
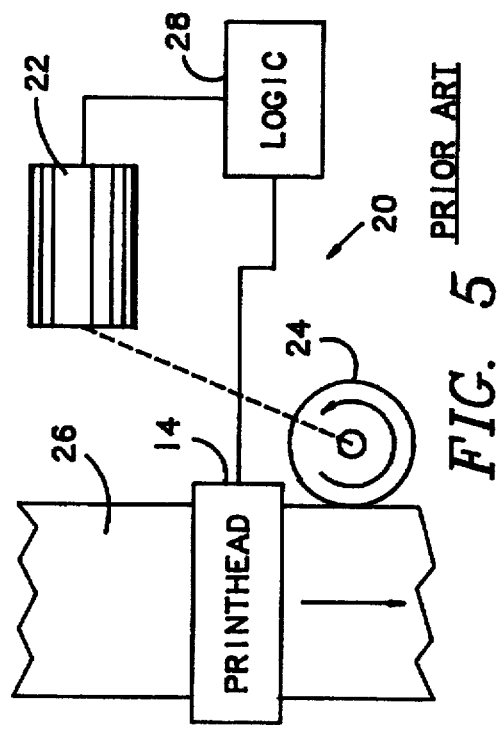
FIG. 5 is a simplified drawing of a prior art bar code printer and its stepping motor drive mechanism.
Figure 8:
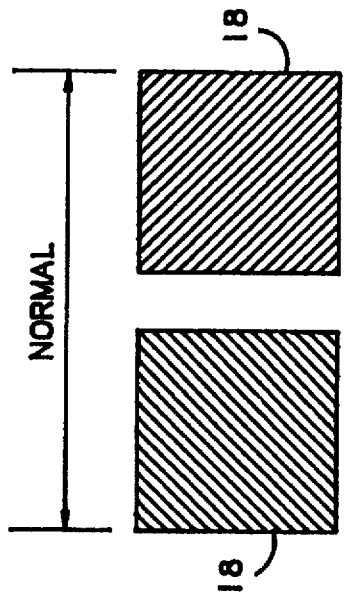
FIG. 8 is an enlarged simplified drawing showing the prior art normal print spacing of adjacent dots by the printer of FIG. 5.
Figure 7:
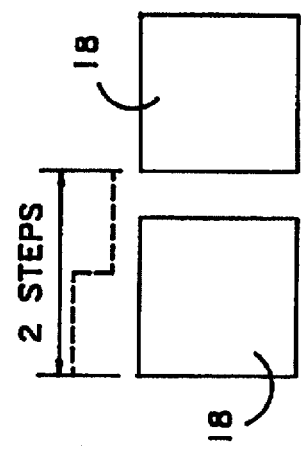
FIG. 7 is an enlarged simplified drawing showing the prior art normal printing of adjacent dots by the printer of FIG. 5.
Figure 10:
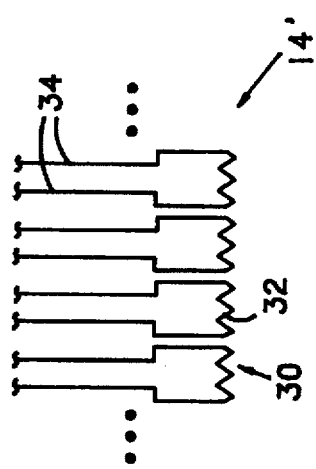
FIG. 10 is an enlarged simplified drawing showing several thermal print positions of a prior art thermal printhead.
Figure 11:
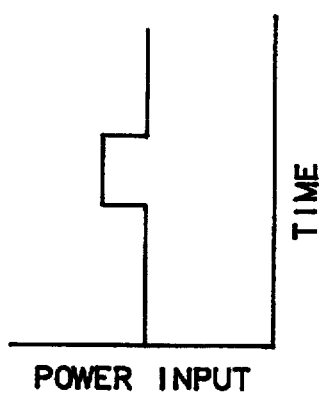
FIG. 11 is a simplified graph showing power input versus time as applied to each of the print positions of FIG. 10 according to prior art printing techniques.
Figure 12:
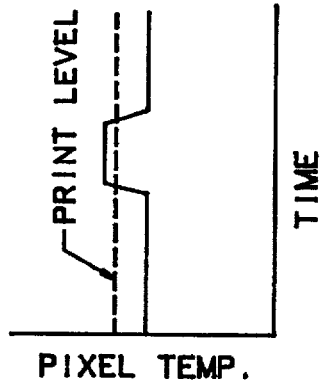
FIG. 12 is a simplified graph showing pixel (i.e. print position) temperature versus time resulting in each of the print positions of FIG. 10 according to prior art printing techniques.

As depicted in FIG. 10, a thermal printhead 14' includes a plurality of print positions 30. Each print position 30 has a heating element 32 connected to wires 34. When power is applied to the wires 34, the heating element 32 increases in temperature. At a certain temperature, the heating element 32 causes a visible dot to appear on the media being printed upon when employing thermal direct techniques where the heat is applied to a heat-sensitive coating on the surface of the media; or, causes ink transferred from a thermally sensitive ribbon to form a dot on the surface of the media when employing thermal transfer techniques. As depicted in the graphs of FIGS. 11 and 12, in order to get a rapid response from each print position 30 as necessary for optimum throughput of the printer, the heating elements 32 are not normally subjected to zero and full power. Rather, the power through the heating elements 32 is constantly at a level which maintains the temperature level of the heating elements 32 at just below printing level. To print with a particular heating element 32, the power level thereto is raised that amount which will cause the temperature to reach the printing level. As seen in FIG. 12, there is a rise time associated with the heating element 32 reaching its printing temperature and a decay time associated with the heating element 32 dropping from its printing temperature once the printing power level is removed.

Figure 13:
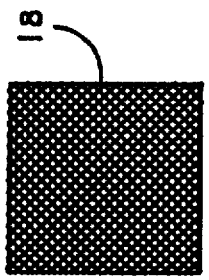
FIG. 13 is an enlarged simplified drawing of a normal sized dot produced by a single print position.
Figure 14:
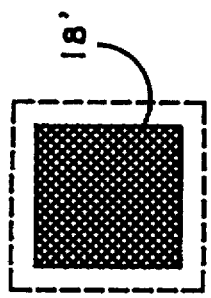
FIG. 14 is an enlarged simplified drawing of a reduced size dot produced by a single print position when operated with less power input.
Figure 15:
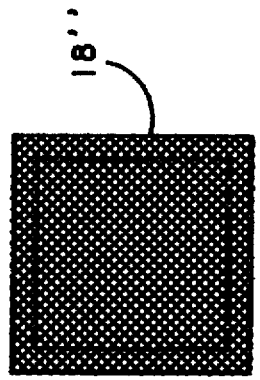
FIG. 15 is an enlarged simplified drawing of an enlarged size dot produced by a single print position when operated with increased power input.

Under normal printing conditions of power level and time applied, the dot 18 produced appears as in FIG. 13. If the power level and/or time of application is reduced, a smaller dot 18' as in FIG. 14 is produced. Correspondingly, if the power level and/or time of application is increased, a larger dot 18" as in FIG. 15 is produced.

Figure 19:
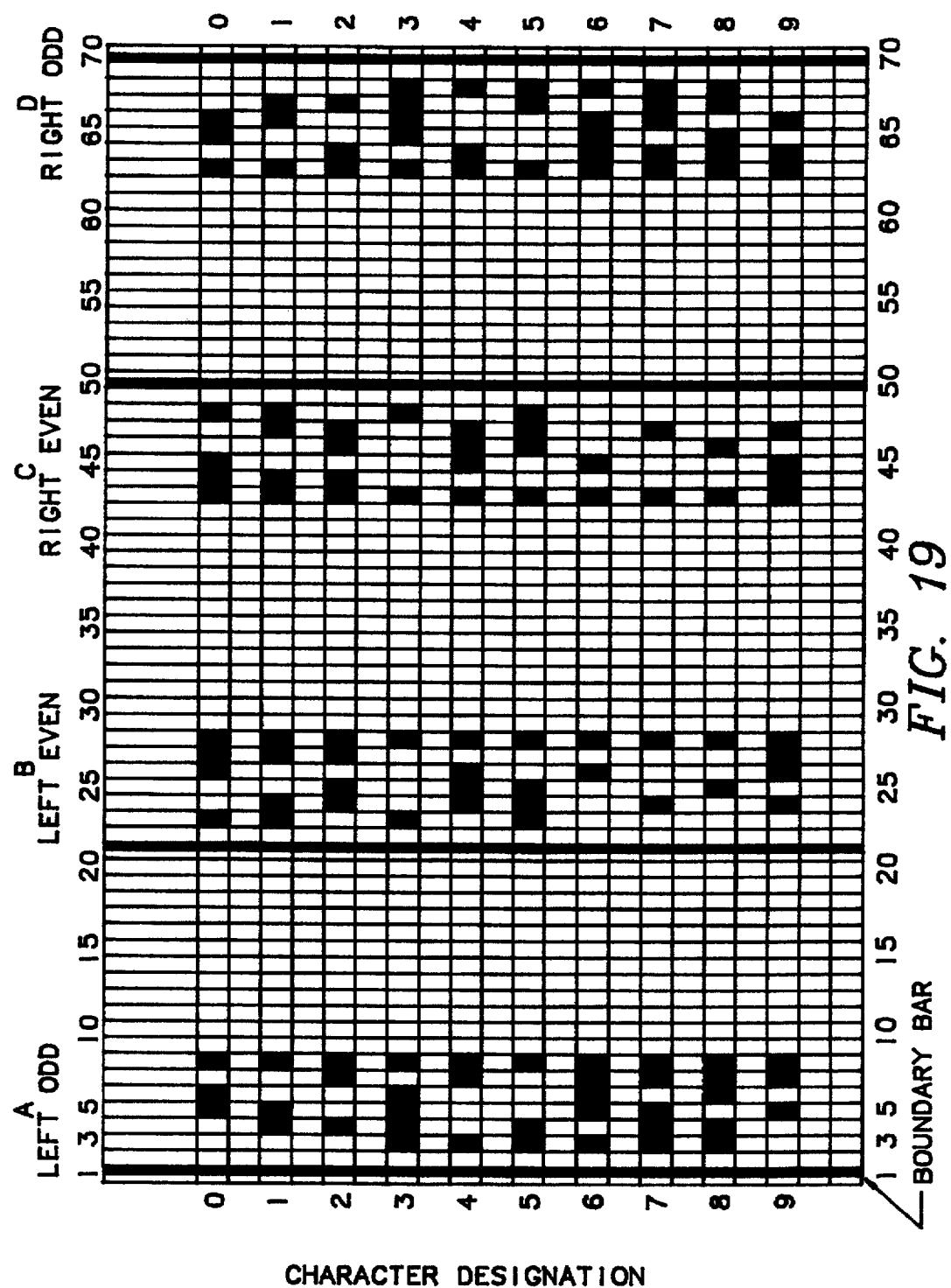
FIG. 19 is a drawing showing the U.P.C./EAN symbology character set.

Table A designates the correction to be applied when printing the characters of FIG. 19 in order to achieve the objectives of the present invention according to one possible implementation thereof. The adjustment of "increase the size of one dot" (+) and "decrease the size of one dot" (−) applies to each bar with the corresponding space decreased or increased, respectively, by the same amount.

TABLE A

| CHARACTER | LEFT ODD | LEFT EVEN | RIGHT EVEN | RIGHT ODD |
|---|---|---|---|---|
| 0 | 0 | 0 | 0 | 0 |
| 1 | − | + | + | − |
| 2 | − | + | + | − |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| 7 | + | − | − | + |
| 8 | + | − | − | + |
| 9 | 0 | 0 | 0 | 0 |

Figure 20:
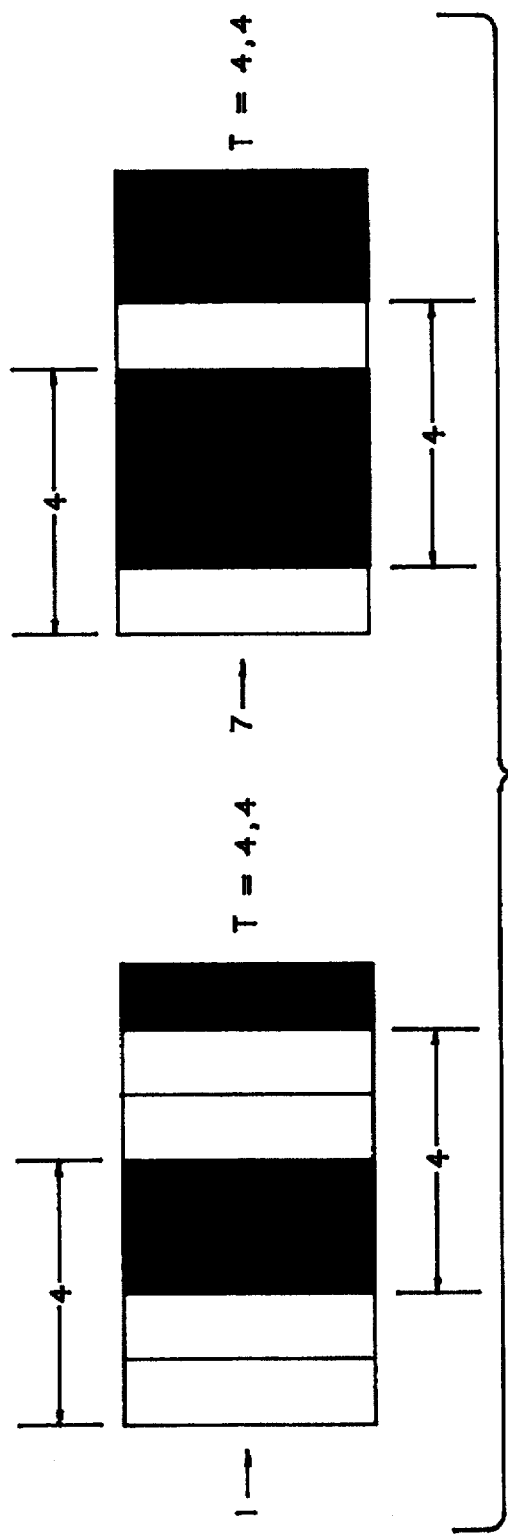
FIG. 20 depicts how the 1 and 7 characters can be misread.
Figure 21:
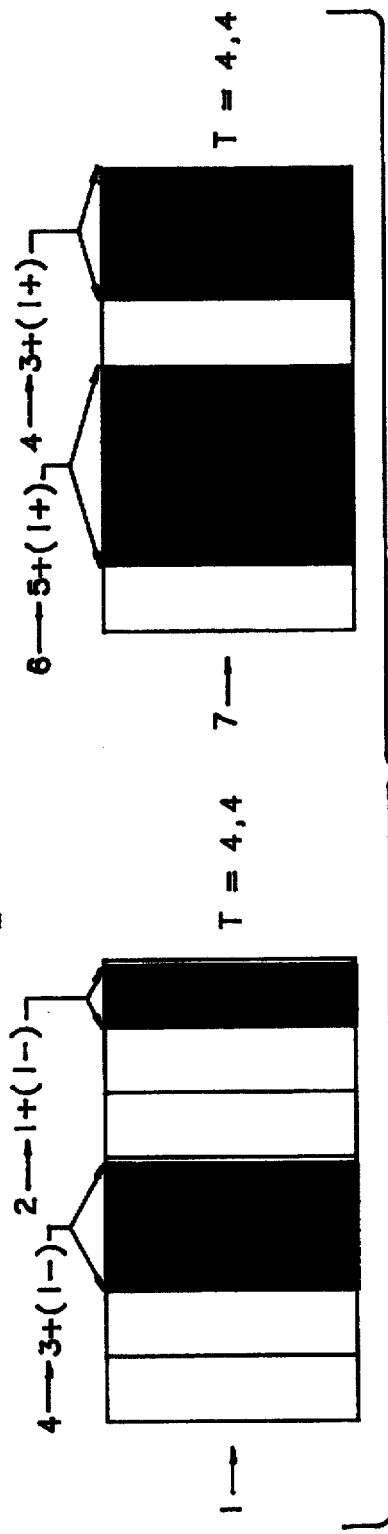
FIG. 21 depicts how the 1 and 7 characters are adjusted according to the present invention.

The drawing of FIG. 21 shows how this is applied to the "left odd" 1 and 7 characters of FIG. 20. Assuming a typical situation for a 192/200 DPI printhead of two horizontal dots in each dot row for each bar position, Table A designates that the bars of the "1" character are to have one dot per bar reduced in size and the bars of the "7" character are to have one dot per bar gain in size. Note that the adjustment is "per bar" and not per bar position. It will be seen that the "bars" of the U.P.C./EAN symbology employ one, two, three, and four bar positions. In the example of FIG. 21, each bar position is made up of two dots. Thus, with respect to the "1" character on the left side of FIG. 21, the bar comprising one bar position goes from two dots full sized dots to one full sized dot and one reduced size dot; and, the bar comprising two bar positions goes from four full sized dots to three full sized dots and one reduced size dot. Similarly with respect to the "7" character on the right side of FIG. 21 the bar having two bar positions goes from four full sized dots to three full sized dots and one increased size dot while the bar having three bar positions goes from six full sized dots to five full sized dots and one increased size dot. The spaces between bars have a corresponding reduction or increase in width.

Typical printing systems according to the present invention for printing in various ways are depicted in FIGS. 16 through 17. In each case, a microprocessor controls the heat directed to a thermal printhead as thermally sensitive media passes by in contact with (or closely adjacent to) the thermal dots, i.e. heating elements 32. The thermal energy of the print head is varied as the media moves past according to instructions stored in memory. When the U.P.C./EAN symbology is printed, the ambiguous characters as described above are printed with different instructions, i.e. definitions, than the rest of the characters. Specifically, the two edges on similar sides of the bars that are internal to each character are printed with increased (or decreased) thermal energy as described above. Thus, the resulting characters maintain constant edge-to-edge measurements and do not effect the character widths in any way. Note that although the compensation could be applied to the other edges and still involve improvement, it is more desirable to avoid disrupting the constant character widths and hence that is not a preferred embodiment of the present invention.

The thermal adjustment of this invention can be applied to higher resolution print heads both alone and in concert with the teachings of the above-described co-pending application. The results would be the same and would be equally beneficial, but especially useful where high print resolution is lacking. In fact, there could be any one of a number of different ways to apply the basic concepts taught in the present invention by those skilled in the art, and those methods should be included within the breadth accorded the claims which follow hereinafter in keeping with the scope and spirit of the disclosure.

Turning to the various printing techniques shown in FIGS. 16 through 18, those will not be addressed with particularity. The printer 36 of FIG. 16 is intended to print in the picket fence mode. The printhead power supply 38 is connected to supply the same current to each of the printhead heating elements 32 that is addressed by the addressing matrix 40 under control of the print logic 42 (in most cases a microprocessor). The print definitions 44 employed by the print logic 42 are set up as a function of time. Thus, to make a column of dots 18 across the printhead 14 bigger or smaller, the time of power application is increased or decreased slightly, respectively.

The printer 36' of FIG. 17 is also intended to print in the picket fence mode. The printhead power supply 38' is again connected to supply the same current to each of the printhead heating elements 32 that is addressed by the addressing matrix 40 under control of the print logic 42. In this case, however, the print logic 42 has a control input 46 to the printhead power supply 38'. The print definitions 44 employed by the print logic 42 are set up as a function of power. Thus, to make a column of dots 18 across the printhead 14 bigger or smaller, the level of power application is increased or decreased slightly, respectively.

The printer 36" of FIG. 18 is intended to print in the drag mode. Thus, each heating element 32 of the printhead 14 must be individually controlled. This is accomplished by putting the printhead power supply 38" in the connections between the addressing matrix 40 and the printhead 14. This is depicted symbolically and the actual manner of accomplishing it would be accomplishable by those of ordinary skill in the art without undue experimentation. While it would probably be possible to individually adjust the power applied to each heating element 32, an easier implementation would be to again have the print definitions 44 as a function of time and simply switch selected heating elements 32 on slightly early or late to create bigger or smaller dots 18, respectively.

Wherefore, having thus described the present invention, What is claimed is:

1. In a demand printer printing a pre-defined U.P.C./EAN symbology character set having "left odd", "left even", "right even", and "right odd" versions as a series of bars separated by spaces in which the bars are formed of horizontal rows of closely adjacent dots by logic designating dots to be printed in the horizontal rows of the bars of the characters, an improvement to prevent ambiguous decoding of "1", "2", "7", and "8" characters printed by the printer comprising the logic including adjusting logic which adjusts the pre-defined U.P.C./EAN symbology character set for the "1", "2", "7", and "8" characters of a selected symbol by:
   a) within the selected symbol, reducing the size of one edge dot per horizontal row from bars of left odd and right odd "1" and "2" characters and of left even and right even "7" and "8" characters; and,
   b) within the selected symbol, increasing the size of one edge dot per horizontal row to bars of left even and right even "1" and "2" characters and of left odd and right odd "7" and "8" characters.

2. The improvement of claim 1 wherein the printer has a thermal printhead comprising a plurality of dot-producing heating elements and the steps thereof comprise:
   a) reducing the power input to the heating element producing the one edge dot per horizontal row from bars of left odd and right odd "1" and "2" characters and of left even and right even "7" and "8" characters; and,
   b) increasing the power input to the heating element producing the one edge dot per horizontal row to bars of left even and right even "1" and "2" characters and to left odd and right odd "7" and "8" characters.

3. The improvement of claim 1 wherein:
   the one edge is a same interior edge of the associated character.

4. In a demand printer printing a pre-defined U.P.C./EAN symbology character set having "left odd", "left even", "right even", and "right odd" versions as a series of bars separated by spaces in which the bars are formed of horizontal rows of closely adjacent dots by logic designating dots to be printed in the horizontal rows of the bars of the characters, a method for preventing ambiguous decoding of "1", "2", "7", and "8" characters printed by the printer comprising the step of:

adjusting the pre-defined U.P.C./EAN symbology character set for the "1", "2", "7", and "8" characters in a selected symbol by:
   within the selected symbol, reducing the size of one edge dot per horizontal row from bars of left odd and right odd "1" and "2" characters and of left even and right even "7" and "8" characters; and,
   within the selected symbol, increasing the size of one edge dot per horizontal row to bars of left even and right even "1" and "2" characters and of left odd and right odd "7" and "8" characters.

5. The method of claim 4 wherein the printer has a thermal printhead comprising a plurality of dot-producing heating elements and the step further comprises:
   a) reducing the power level being input to the heating element producing the one edge dot per horizontal row from bars of left odd and right odd "1" and "2" characters and of left even and right even "7" and "8" characters; and,
   b) increasing the power level being input to the heating element producing the one edge dot per horizontal row to bars of left even and right even "1" and "2" characters and to left odd and right odd "7" and "8" characters.

6. The method of claim 4 wherein the printer has a thermal printhead comprising a plurality of dot-producing heating elements and the step further comprises:
   a) reducing the time a constant power level is input to the heating element producing the one edge dot per horizontal row from bars of left odd and right odd "1" and "2" characters and of left even and right even "7" and "8" characters; and,
   b) increasing the time a constant power level is input to the heating element producing the one edge dot per horizontal row to bars of left even and right even "1" and "2" characters and to left odd and right odd "7" and "8" characters.

7. The method of claim 4 wherein:
   the one edge is a same interior edge of the associated character.

8. In a printer printing a pre-defined bar code symbology character set as a series of bars separated by spaces in which the bars are formed of horizontal rows of closely adjacent dots by logic designating dots to be printed in the horizontal rows of the bars of the characters, an improvement to prevent ambiguous decoding of similar character pairs printed by the printer in which one character employs wide bars and one character employs narrow bars comprising the logic including adjusting logic which adjusts the pre-defined symbology character set for the similar characters of a selected symbol by:
   a) within the selected symbol reducing the size of one edge dot per horizontal row from bars of similar characters employing narrow bars; and,
   b) within the selected symbol, increasing the size of one edge dot per horizontal row to bars of similar characters employing wide bars whereby the difference in bar width is increased.

9. The improvement of claim 8 wherein the printer has a thermal printhead comprising a plurality of dot-producing heating elements and the steps thereof comprise:
   a) reducing the power input to the heating element producing the one edge dot per horizontal row from bars of similar characters employing narrow bars; and,
   b) increasing the power input to the heating element producing the one edge dot per horizontal row to bars of similar characters employing wide bars whereby the difference in bar width is increased.

10. The improvement of claim 8 wherein:

the one edge is a same interior edge of the associated character.

11. A method of printing a selected symbol including a pre-defined symbology character set as a series of bars separated by spaces in which the bars are formed of horizontal rows of closely adjacent dots while preventing ambiguous decoding of similar character pairs in which one character employs wide bars and one character employs narrow bars comprising the steps of:

a) within the selected symbol reducing the size of one edge dot per horizontal row from bars of similar characters employing narrow bars; and, b) within the selected symbol increasing the size of one edge dot per horizontal row to bars of similar characters employing wide bars whereby the difference in bar width is increased.

12. The method of claim 11 wherein the printer has a thermal printhead comprising a plurality of dot-producing heating elements and the steps thereof comprise:

a) reducing the power input to the heating element producing the one edge dot per horizontal row from bars of similar characters employing narrow bars; and, b) increasing the power input to the heating element producing the one edge dot per horizontal row to bars of similar characters employing wide bars whereby the difference in bar width is increased.

13. The method of claim 11 wherein:

the one edge is a same interior edge of the associated character.

14. A demand printer printing a pre-defined U.P.C./EAN symbology character set having "left odd", "left even", "right even", and "right odd" versions as a series of bars separated by spaces in which the bars are formed of horizontal rows of closely adjacent dots by logic designating dots to be printed in the horizontal rows of the bars of the characters, CHARACTERIZED BY preventing ambiguous decoding of "1", "2", "7", and "8" characters printed by the printer in a selected symbol comprising:

a) a thermal printhead comprising a plurality of dot-producing heating elements;

b) a power supply;

c) an addressing matrix connecting said power supply to selected ones of said plurality of dot-producing heating elements as a function of addressing inputs thereto;

d) a print definition table containing definitions of the U.P.C./EAN symbology character wherein definitions for the "1", "2", "7", and "8" characters are modified by, d1) reducing the size of one edge dot per horizontal row for bars of left odd and right odd "1" and "2" characters and of left even and right even "7" and "8" characters, and d2) increasing the size of one edge dot per horizontal row for bars of left even and right even "1" and "2" characters and of left odd and right odd "7" and "8" characters; and, e) print logic configured to use the definitions of left odd "1" and "2" characters and left odd and right odd "7" and "8" characters from said print definition table to input addressing inputs of said addressing matrix to print desired U.P.C./EAN symbology characters within the selected symbol.

15. The printer of claim 14 wherein the print logic uses said definitions from said print definition table to:

a) reduce the power level being input to the heating element producing the one edge dot per horizontal row from bars of the left odd and right odd "1" and "2" characters and of the left even and right even "7" and "8" characters; and, b) increase the power level being input to the heating element producing the one edge dot per horizontal row to bars of the left even and right even "1" and "2" characters and the left odd and right odd "7" and "8" characters.

16. The printer of claim 14 wherein the print logic uses said definitions from said print definition table to:

a) reduce the time a constant power level is input to the heating element producing the one edge dot per horizontal row from bars of left odd and right odd "1" and "2" characters and of left even and right even "7" and "8" characters; and, b) increase the time a constant power level is input to the heating element producing the one edge dot per horizontal row to bars of left even and right even "1" and "2" characters and to left odd and right odd "7" and "8" characters.

17. The printer of claim 14 wherein said definitions correspondingly adjust spaces of characters associated with adjusted width bars to cause edge-to-edge measurements of "1", "2", "7", and "8" U.P.C./EAN symbology characters printed thereby not to be effected by the adjustment.

* * * * *